Dec. 21, 1954  W. J. HIRTREITER  2,697,343
DYNAMIC CALIBRATOR FOR RATE GYROSCOPES
Filed May 28, 1952  2 Sheets-Sheet 1

INVENTOR.
WALTER J. HIRTREITER
BY Charles R. Burgoyne
AGENT
AND
ATTORNEY

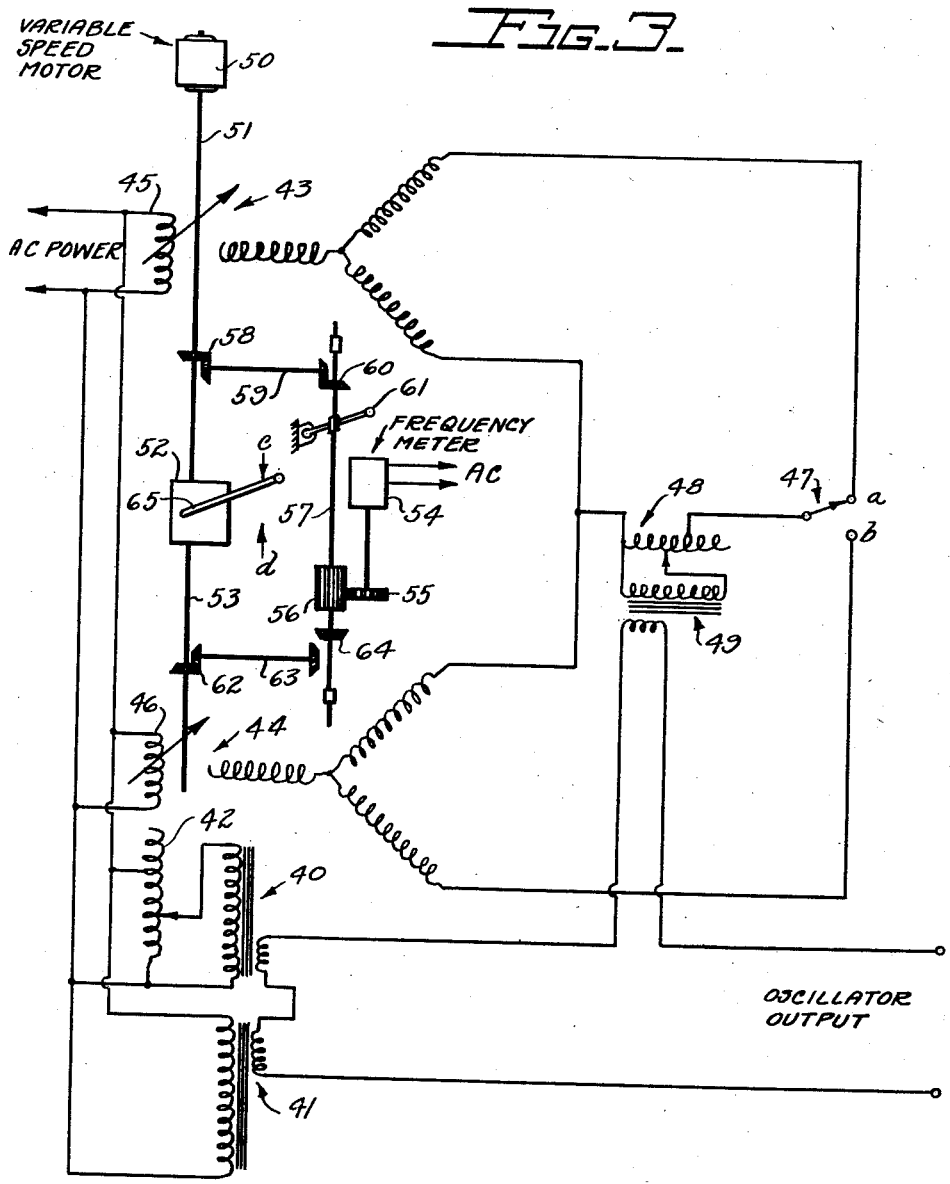

United States Patent Office 2,697,343
Patented Dec. 21, 1954

2,697,343
DYNAMIC CALIBRATOR FOR RATE GYROSCOPES

Walter J. Hirtreiter, Buffalo, N. Y., assignor to the United States of America as represented by the Secretary of the Air Force Application May 28, 1952, Serial No. 290,597

5 Claims. (Cl. 73—1)

The present invention relates to a dynamic calibrator for testing rate gyroscopes.

The primary object of the invention is to provide a low-rate gyroscope calibrator including a gyro mounting platform rotatably mounted for oscillation on a vertical axis and actuated by means capable of generating pure and simple harmonic motion free from the objectionable effects of gear and motor vibrations and including means for accurately controlling the frequency and amplitude of the actuating means.

A further object of the invention is to provide a low-rate gyroscope calibrator including a gyro mounting platform rotatably mounted for oscillation on a vertical axis and actuated by expansion and contraction of a sinusoidally heated resistance wire wherein the heated wire is arranged in compact form by the use of a series of parallel wires interconnected at the ends of adjacent pairs of wires by lever elements pivoted intermediate of the ends of such elements.

The above and other objects of the invention will become apparent upon reading the following detailed description in conjunction with the accompanying drawings, in which:

Fig. 3 is a wiring diagram of the oscillator which has its output electrically connected to the platform controlling means of the present calibrator.

The problem of generating pure and simple harmonic motion for the dynamic calibration of rate gyroscopes in the lower angular velocity regions has been under consideration for some time. Major efforts of consideration have been directed toward a calibration apparatus which can accurately produce dynamic rates of magnitudes comparable to those which rate gyros will attempt to measure in actual flight conditions. This places the lower range we are interested in from about 0.01 degree per second to 1.0 or possibly 2.0 degrees per second, single amplitude.

To obtain the frequency response characteristics of any gyro being calibrated, it is desirable to employ a calibrator whose output frequency can be easily varied through a suitable range. For the calibration limits considered herein, a range of from 0.05 cycle per second to 12 cycles per second appears adequate for investigating rate gyro characteristics in the low rate regions mentioned above. In addition, it is apparent that some means for amplitude control is desirable which will then enable the generation of a range of angular velocities at any one fixed frequency. The incorporation of the above mentioned features and ranges in a strictly mechanical device using gears, cams, links and Scotch yokes would require practically unattainable accuracy in machining and construction.

Briefly the present dynamic calibrator for rate gyroscopes comprises a gyroscope platform mounted for oscillation about a vertical axis and connected to an electrically heated Nichrome wire continuously connected to the output of an electrical oscillator adapted to generate sinusoidally varying power of controllable frequency and amplitude. Advantageous features of the calibration system include the attainment of very low rates of displacement, freedom from the objectionable effects of gear and motor vibrations and the use of convenient means for accurately controlling the frequency and amplitude of the oscillator output.

Calibrator assembly

Figure 1:
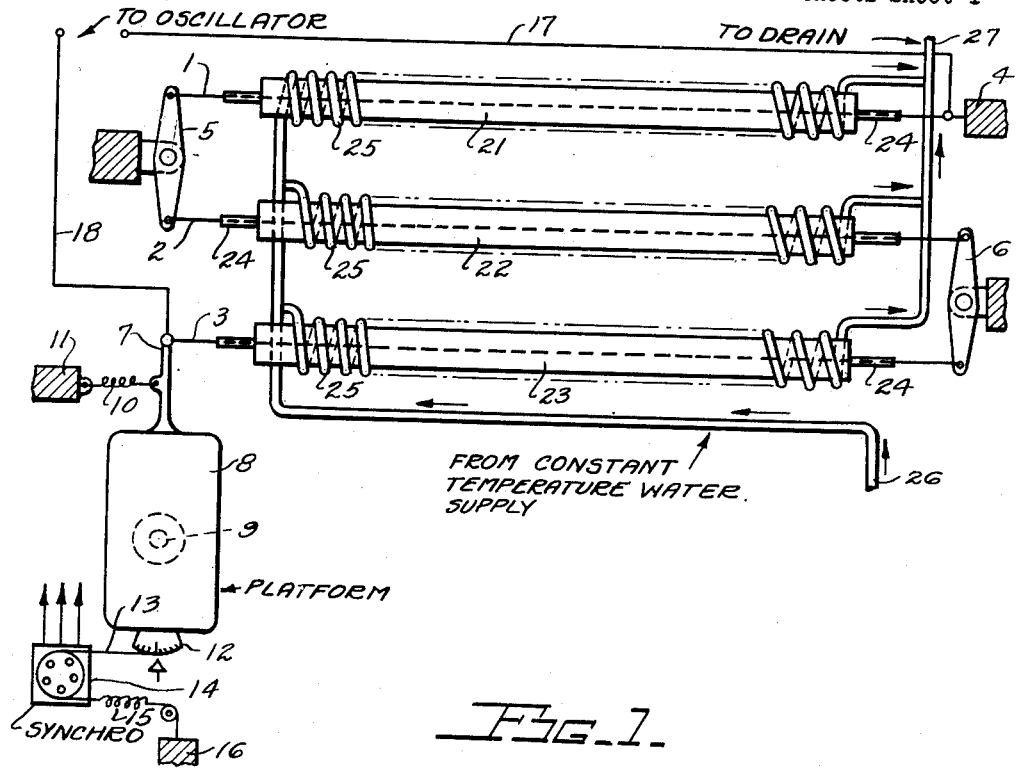
Fig. 1 is a schematic plan view of mechanical set-up forming the principal part of the present calibrator.

Considering the drawings it will be noted that Fig. 1 represents the calibrator in its simplest form. In order to make a compact apparatus, the wire to be heated by sinusoidally varying power is arranged in three separate sections 1, 2 and 3 forming an articulated system proceeding from an anchor or support 4 through wire section 1 to lever 5, thence through wire section 2 to lever 6 and thence through wire section 3 to an extension 7 on the gyroscope mounting platform 8. Nichrome wire is preferred because of its long life under elevated temperature. The platform 8 is mounted to turn about a vertical axis, as at 9, and is constantly biased to turn in a counterclockwise direction by means of a coil spring 10 extending to a support 11. A graduated sector 12 fixed to the platform has a flexible wire or belt 13 fixed thereon and extending along the curved forward edge to connect the platform to a synchro unit 14. A coil spring 15 in series with the belt 13 keeps it under tension and the other end of the belt attaches to a support 16.

The opposite terminals of the three articulated and electrically connected wire sections 1, 2 and 3 are connected by leads 17 and 18 to a power oscillator supplying a sinusoidal voltage which is adjustable in frequency and amplitude. The Nichrome wire suspension may have various physical dimensions but in one example the wire was of 0.04 inch diameter while each of the three sections was 31 inches long. The total resistance was 3.2 ohms, the nominal voltage across the terminals was 33 volts and the nominal operating temperature of the wire was 600 degrees centigrade. The coefficient of expansion of the wire is 0.000017 inch per inch per degree centigrade. In this example the platform 8 was about 6 by 12 inches in plan, the edge of sector 12 had a 7 inch radius about the axis 9 and the pulley on synchro 14 had a radius of 0.7 of an inch. In order to stabilize the operating temperature of the heated wire a series of tubular jackets 21, 22 and 23 are placed around the wire sections and anchored to a mounting base plate or "breadboard" on which the whole apparatus of Fig. 1 is securely mounted. The opposite ends of the jackets 21 to 23 are closed except for thin tubular extensions 24 through which the wires pass. Wound around the jackets 21 to 23 are water tubes 25 through which is passed a constant temperature fluid supply by way of inlet pipe 26 and outlet pipe 27. By the use of constant temperature jackets around the heated wires, the free air spaces within these jackets are maintained at constant temperature in so far as possible. Of course the tubular extensions 24 are carefully insulated on the interior thereof to preclude the possibility of shorting out portions of the wire suspension. As the three wire sections expand under the heating effect of the sinusoidally varying power supply, the platform 8 rotates slightly in the counterclockwise direction by reason of the tension or force exerted by spring 10. The platform action is transmitted to synchro 14 by means of belt 13. Since the power supply has a sinusoidally varying voltage, the platform develops a recurring pattern of movement to correspond. That is, any point thereon except the center of rotation will develop a simple harmonic motion. Further operating characteristics will be discussed below.

Indicator system

Figure 2:
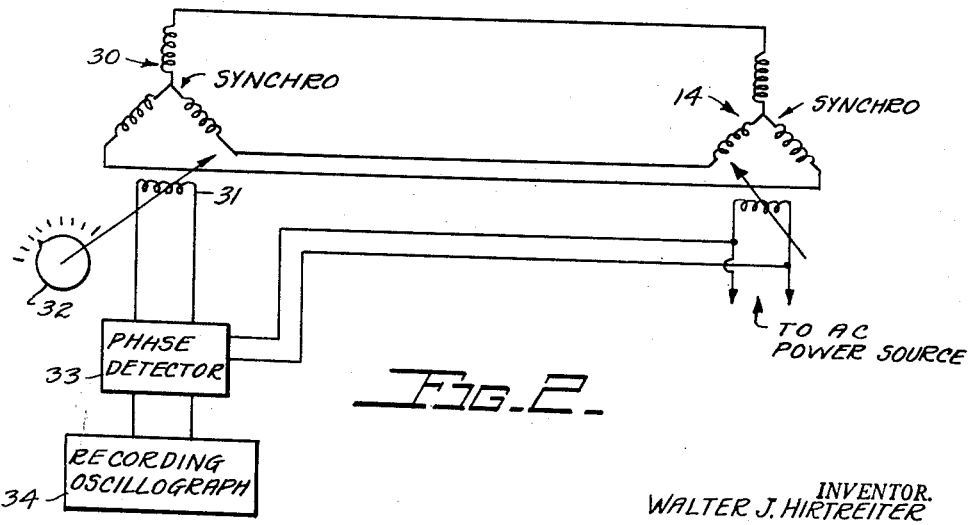
Fig. 2 is a wiring diagram of the indicating system associated with the present calibrator, and particularly associated with the gyroscope mounting platform.

In order to show the action or movement of the platform 8 as produced by the heated wire actuating system, the movement imparted to the rotor of the synchro 14 is used to originate a signal fed into a synchro transformer 30 (see Fig. 2). The rotor element 31 of the transformer 30 is adjustable by means of a knob 32 in order to buck out any residual signal when the platform 8 is at rest, so that the indicator can be zeroed before operation of the calibrator is started. The output of the transformer 30 is fed to a phase detector 33 to convert the signal to a direct current and the direct current signal is then fed to the galvanometer terminals of a recording oscillograph 34. A similar indicating system may be used in simultaneously indicating the response of the rate gyroscope to be mounted on the platform 8.

Power oscillator

The power oscillator (Fig. 3) is for supplying a sinusoidal voltage, adjustable in frequency and amplitude, to the Nichrome wire suspension of the calibrator. By plotting the per cent elongation of Nichrome wire versus the applied voltage it was found that a straight line relation was obtained only when the applied voltage was at about fifteen or more volts. Therefore the oscillator output must include a voltage bias so that the wire suspension is never operating below the straight line range. This bias has been chosen in one example as 33 volts. This bias is fed into the oscillator output from stepdown transformers 40 and 41. The output of transformer 40 is adjustable by means of a resistor 42 to make possible a variation in the bias voltage from 20 to 40 volts.

The 33 volt bias voltage is varied or modulated sinusoidally by means of rotating synchro generators 43 and 44 which are of similar construction but which have their rotating elements 45 and 46 driven at different speed ranges. By use of a two-position switch 47, modulation may be accomplished by the output from one or the other of the generators 43 or 44. With the switch on contact $a$ the generator 43 acts as a modulator, while turning the switch to contact $b$ causes the generator 44 to act as a modulator. Any portion of the total outputs of the respective modulators may be selected by adjustment of a resistor 48 and the output thereof is matched to the wire suspension circuit impedance by means of the transformer 49. In the example of the invention which was constructed, the modulating voltage was variable from 0 to 13 volts. The bias voltage and the modulating voltage are added algebraically in the circuit and applied to the wire suspension of the calibrator. That is, the modulating voltage changes phase by 180 degrees each half of the modulating cycle and therefore alternately adds to or subtracts from the 33 volt bias voltage. By observations made on an experimental basis using the present wire expansion principle, wherein both the wire motion and the exciting voltage were recorded, it was shown that the motion of the wire lagged the modulating voltage by nearly 90 degrees even at the lowest frequencies of modulation. This characteristic of the "hot wire" system suggests that it behaves as an integrator and by implication suggests that the angular velocity of the gyro platform 8 after any initial amplitude setting is then essentially independent of the input frequency.

The variable speed drive for the rotating synchro generators 43 and 44 includes a variable speed motor 50 driving the element 45 of generator 43 directly through shaft 51. The element 46 of generator 44 is driven through shaft 51, two-speed transmission 52 and another shaft 53. The output of only one generator is used at a time, the proper selection being made by the selector switch 47. The instant frequency of the generator is indicated on the frequency meter 54 which is driven by gear wheel 55 meshing with a sliding gear 56 on the countershaft 57. When the generator output is that from generator 43 the shaft 57 is driven through bevel gears 58, shaft 59 and bevel gears 60. When the output of generator 44 is selected, the countershaft 57 is shifted axially by lever 61 and thereby the shaft 57 is driven through bevel gears 62, shaft 63 and bevel gears 64. A gear shift lever 65 on the transmission 52 enables the shaft 53 to be driven at two different speed ranges depending on whether the lever is at position $c$ or position $d$. In the example constructed and used on tests the output of synchro generator 43 is varied from 0.3 to 3.0 cycles per second by speed regulation of the motor 50. When the output of generator 44 is selected by the use of switch 47, the output is varied from 0.05 to 0.5 cycle per second with the lever 65 in position $c$ to obtain a 6 to 1 speed reduction. The output is varied from 1.2 to 12 cycles per second with the lever 65 in position $d$ to obtain a 4 to 1 speed step up from shaft 51 to shaft 53. The oscillator is mounted on a separate chassis and is connected to the calibrator unit only by a power cable. Thus the calibrator unit need not be subject to any vibration from the oscillator drive mechanism.

Operation

From the above description it will be seen that the present invention provides a low-rate gyro calibrator in which the platform 8 is mounted to oscillate about a vertical axis 9. A rate gyroscope to be tested is mounted on the platform 8 in some secure manner. The platform includes an extension 7 connected to the "hot wire" system 1, 2, 3 and also to the tension spring 10. The wire system is connected across the output terminals of an oscillator capable of producing sinusoidal power of controlled frequency and amplitude. The power supply has a voltage which varies in a sinusoidal pattern, so that its heating effect on the wire will also vary in a similar manner. Therefore the wire will expand and contract in response to the sinusoidal oscillator output. As the wire expands the spring 10 will cause oscillation of the platform 8 in a counterclockwise direction and as the wire contracts the platform is oscillated in clockwise direction against the yieldable force exerted by spring 10. Because of the fact that the expansion characteristics of an electrically heated Nichrome wire do not follow a straight line relation unless the wire has an applied voltage of about 15 volts or more, the oscillator includes means to produce a substantial voltage bias which is modulated by means of a modulating voltage having a sinusoidally varying value. Since the platform 8 has a synchro system connected thereto for feeding a signal to a recording oscillograph, the motion of the platform 8 is readily observed. With a rate gyroscope mounted on the platform 8, the action of the gyro in response to the platform action can be observed and recorded.

The embodiment of the invention herein shown and described is to be regarded as illustrative only and it is to be understood that the invention is susceptible of variations, modifications and changes within the scope of the appended claims.

I claim:

1. A dynamic apparatus for use in calibrating rate gyroscopes comprising, a platform serving as a mounting support for a rate gyroscope, means supporting said platform for oscillation about an axis normal to the plane of the platform, means including a section of resistance wire extending from a portion of said platform to a relatively fixed support, means acting on said platform to maintain said wire in tension, tubular means surrounding said wire and spaced therefrom providing a jacket, coiled tubing around said tubular means for conducting a cooling fluid from a constant temperature supply to maintain a substantially constant temperature in said jacket, and means connected electrically to said wire to supply thereto a sinusoidally varying power input whereby the platform may be oscillated and means connected to said platform for recording the oscillations thereof.

2. A dynamic apparatus for use in calibrating rate gyroscopes comprising, a platform serving as a mounting support for a rate gyroscope, means supporting said platform for oscillation about an axis normal to the plane of the platform, means including a section of resistance wire extending from a portion of said platform to a relatively fixed support, means acting on said platform to maintain said wire in tension, means connected electrically to said wire to supply thereto a sinusoidally varying power input adjustable in frequency and in amplitude, a first synchro unit having a rotatable element driven by means attached to said platform, and a second synchro unit connected electrically to said first synchro unit and also connected through a phase detector to a recording oscillograph.

3. A dynamic apparatus for use in calibrating rate gyroscopes comprising, a platform serving as a mounting support for a rate gyroscope, means supporting said platform for oscillation about an axis normal to the plane of the platform, means including a section of resistance wire extending from a portion of said platform to a relatively fixed support, means acting on said platform to maintain said wire in tension, tubular means surrounding said wire to provide a dead air space therearound, coiled tubing around said tubular means for conducting fluid from a constant temperature source, means connected electrically to said wire to supply thereto a sinusoidally varying power input adjustable in frequency and in amplitude, a first synchro unit having a rotatable element coupled to said platform, and a second synchro unit connected electrically to said first synchro unit and also connected through a phase detector to a recording oscillograph.

4. A dynamic apparatus for use in calibrating rate gyroscopes comprising, a platform serving as a mounting support for a rate gyroscope, means supporting said platform for oscillation about an axis normal to the plane of the platform, a base plate, a plurality of parallel resistance wires of equal length arranged in coplanar relation adjacent to said base plate, means to anchor one end of one wire to said base plate, means attaching one end of another wire remote from said one wire to said platform at a point spaced from its axis of rotation, metallic lever means pivoted intermediate the ends on said base plate and having opposite ends connected to corresponding ends of adjacent pairs of wires, means acting on said platform to maintain said wires in tension, a power oscillator having its output connected to said one end of said one wire and to said one end of said other wire and supplying to said wires connected in series relation by said metallic lever means a sinusoidally varying power input adjustable in frequency and amplitude, and means coupled to said platform for indicating the instantaneous values of frequency and amplitude of the platform oscillations caused by alternate contraction and expansion of said wires.

5. A dynamic apparatus for use in calibrating rate gyroscopes comprising, a platform serving as a mounting support for a rate gyroscope, means supporting said platform for oscillation about an axis normal to the plane of the platform, a base plate, three parallel and coplanar resistance wires of equal length adjacent to said base plate, means to anchor one end of the first wire to said base plate, means attaching the opposite end of the third wire to said platform at a point spaced from its axis of rotation, a first metallic lever pivoted intermediate its ends on said base plate and having its opposite ends connected to adjacent ends of the first and second wires, a second metallic lever pivoted intermediate its ends on said base plate and having its opposite ends connected to adjacent ends of the second and third wires, means acting on said platform to maintain said wires in tension, a power oscillator having its output connected to said one end of said first wire and to said opposite end of said third wire to supply to the series connected wires a sinusoidally varying power input adjustable in frequency and amplitude, and means coupled to said platform for indicating the instantaneous values of frequency and amplitude of the platform oscillations caused by alternate contraction and expansion of said wires.

References Cited in the file of this patent

UNITED STATES PATENTS

| Number | Name | Date |
|---|---|---|
| 1,859,099 | Lewis et al. | May 17, 1932 |
| 2,442,764 | Ferrill et al. | June 8, 1948 |
| 2,466,703 | Harrison et al. | Apr. 12, 1949 |
| 2,470,069 | Davies | May 10, 1949 |
| 2,470,773 | Haskins | May 24, 1949 |
| 2,497,069 | Carpenter et al. | Feb. 14, 1950 |
| 2,555,882 | Guajardo | June 5, 1951 |